April 3, 1962           L. PÉRAS           3,027,978
DISC BRAKES
Filed June 17, 1958           3 Sheets-Sheet 1
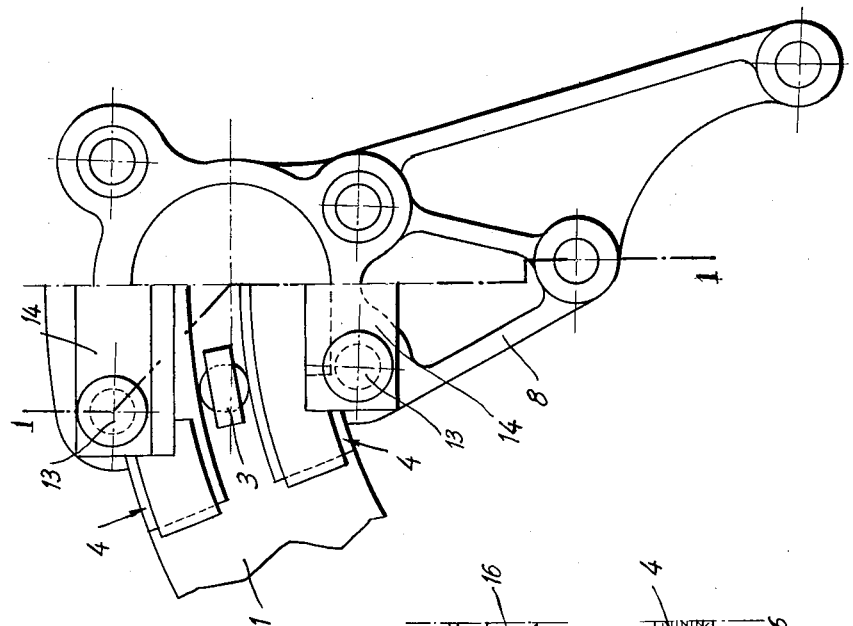
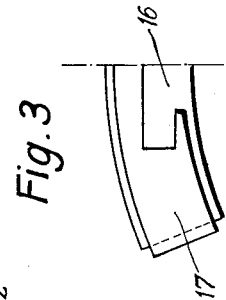
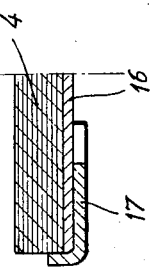
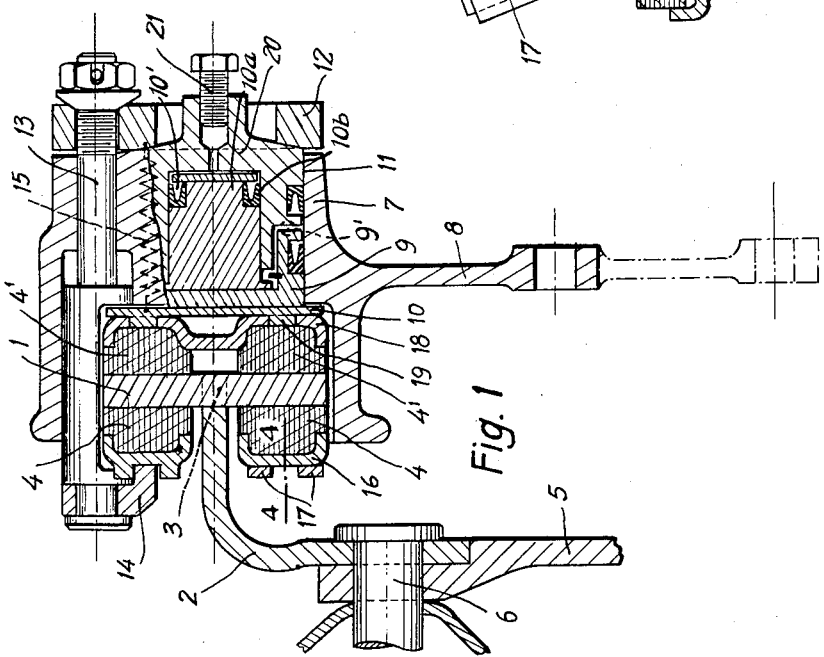

April 3, 1962 L. PÉRAS 3,027,978
DISC BRAKES

Filed June 17, 1958 3 Sheets-Sheet 2

INVENTOR.
LUCIEN PERAS
BY
*Robert E. Burns*
ATTORNEY

April 3, 1962  L. PÉRAS  3,027,978
DISC BRAKES

Filed June 17, 1958  3 Sheets-Sheet 3

United States Patent Office 3,027,978
Patented Apr. 3, 1962

3,027,978
DISC BRAKES
Lucien Pèras, Billancourt, France, assignor to Regie Nationale des Usines Renault, Billancourt, France
Filed June 17, 1958, Ser. No. 742,586
Claims priority, application France Aug. 1, 1957
6 Claims. (Cl. 188—72)

This invention relates to disc brakes and notably to those designed for equipping automotive vehicles.

In brakes of this character the disc is solid with the wheel and fixed in position, and consequently it is essential to avoid any mounting of the various parts that might occasion any distortion of the clamping portion relative to the clamped portion.

Now it is the essential object of this invention to provide a particularly advantageous arrangement whereby such distortions are avoided completely. This arrangement is characterized notably in that the annular disc is held endwise of a supporting member solid with the wheel in its central region and that four linings are provided, that is, two disposed on either side of the supporting member on the disc face associated with this member, and two others on the opposite face, these linings being actuated from a common pressure-operated cylinder disposed on the side opposite to that on which the supporting member is placed.

With this arrangement, a well-balanced structure is obtained which eliminates any detrimental distortion.

The invention is also concerned with a specific arrangement whereby the brake linings may be replaced easily and quickly.

In order to afford a clearer understanding of this invention and of the manner in which the same may be carried out in practice, reference will now be made to the accompanying drawings forming part of this specification and illustrating diagrammatically by way of example a few embodiments thereof. In the drawings;

FIGURE 1 is a fragmentary radial section taken upon the line 1—1 of FIG. 2;

FIGURE 2 is a front elevation showing a half-view from the outer side and a half-view of the brake cylinder;

FIGURE 3 is a detail view;

FIGURE 4 is a detail section showing a lining, the section being taken upon the line 4—4 of FIG. 1;

Figure 9:
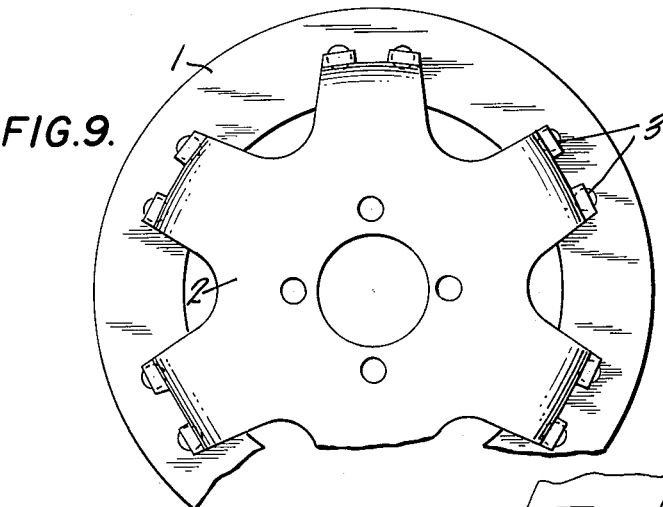
FIG. 9 is an elevational view of the brake assembly as seen from the left of FIG. 1.
Figure 10:
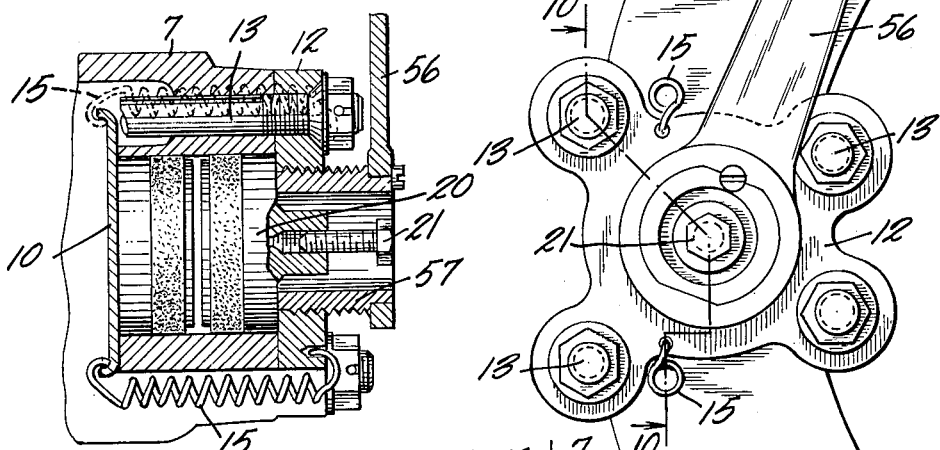
FIG. 10 is a sectional view taken along the line 10—10 of FIG. 11.

Referring to the drawings, it will be seen that the brake comprises a one-piece annular disc 1 supported along its intermediate diameter or circumference and at different locations endwise of a spider-shaped member 2, the outer ends of the arms of this spider extending through the disc 1 and being riveted or caulked thereon as shown at 3. Associated with this disc are brake linings 4 of which two are disposed on the side of the supporting member 2 on either side thereof, so as to provide a passage permitting the rotation of the spokes or arms 2 of the supporting member carried by the wheel 5, for example by means of bolts 6. The other two linings 4' are disposed on the other face of the disc and register with the former two, as shown.

These linings are clamped in a manner similar to that described in U.S. patent application Ser. No. 684,127, filed September 16, 1957, now Patent No. 2,963,116.

The clamping device consists of a pressure cylinder 7 disposed on the side opposite to said supporting member relative to the disc and supported from the frame or other fixed part of the vehicle by a support 8, this cylinder being of the two-piston type.

One piston 9 of cylinder 7 engages directly a plate 10 supporting the linings 4'. The other piston 11 engages a flange 12 adapted, through the intermediary of rods 13, to actuate or press the linings 4. Fluid is introduced between the pistons in conventional manner as through an inlet 9' shown in FIG. 1. To this end, the rods 13 are provided with lugs 14 engaging the linings 4 by a bearing surface extending at right angles to the wheel radius passing through the middle of the linings concerned (see FIG. 2), thereby providing an action parallel to the disc whatever be the pressure utilized. Return springs shown diagrammatically at 15 provide an adequate tension between the plate 10, and the flange 12.

It is another characteristic feature of this invention to provide an improved mounting of the brake linings. Each brake lining 4 is embedded in a suitable section member 16 having welded on its back a bearing plate 17 adequately notched to provide a guiding action for the lugs 14. On the other hand, the linings 4' are embedded in a section member 18 formed with orifices receiving studs 19 solid with the aforesaid plate 10. The linings are held against circumferential movement by reason of their engagement in members 16 and 18 and the latter, along with plate 10, are held against circumferential movement by engagement with the brake cylinder 7, e.g. through the rods 13.

An adjustment device, for example of the hydraulic type, as defined by the fluid-filled chamber 10' sealed by the gasket 10b and closed by the screw 21, the fluid in chamber 10' acting on inner piston 10a, determines the return stroke of the brake pistons so as to provide a moderate and constant release clearance irrespective of the degree of lining wear. This adjustment device is provided by the chamber 10' on the outer side of the piston 10a, the chamber being sealed by a gasket 10b and having a partially threaded drain port closed by a screw 21.

When the linings are worn to a degree requiring their replacement with new ones, the two pistons may be moved towards each other by removing the screw 21 and exhausting through the drain port the fluid limiting their release movement.

Then, as the thickness of members 17 and 19 is smaller than the amount of lining wear contemplated, the linings and their supports 16, 18 may be removed in view of their replacement.

Figure 11:
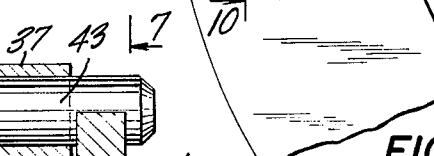
FIG. 11 is a fragmentary elevational view on an enlarged scale of the outer side of the brake showing the hand control device.
Figure 5:
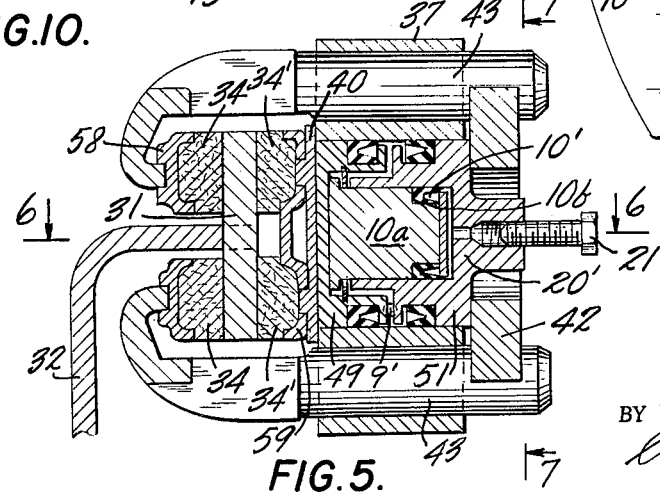
FIGURE 5 is a section similar to FIG. 1 but showing a modified form of embodiment of the brake, the section being taken along the wheel axis and also through one of the disc braking devices.
Figure 6:
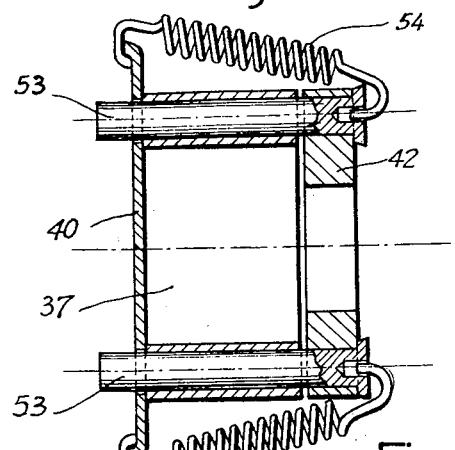
FIGURE 6 is a detail shown in section along the line 6—6 of FIG. 5.

Of course, the brake may be equipped with any known and suitable hand-control device, for example as shown at 56 in FIG. 11, and advantageously with the device shown and described in the aforesaid patent application.

FIGURES 5 to 8 of the drawings illustrate a modified construction permitting an easy replacement of the brake linings. Referring to these figures, the brake illustrated therein comprises an annular disc 31 supported by a spider 32 carried by the wheel (not shown). Associated with this disc 31 are outer linings 34 and inner linings 34[1].

The clamping device consists of a pressure cylinder 37 usually mounted endwise of the hub or on any other unsprung portion of the vehicle.

The pistons 49, 51 in cylinders 37 act respectively directly on the plate 40 carrying the inner linings 34[1] and through the medium of the flange 42 and rods 43 slidably mounted in cylinder 37 on the outer linings 34. In the arrangement constituting the subject-matter of this invention the rods 43 have a relatively substantial diameter and are formed at their ends adjacent the flange 42 with a notch 52 engaged by flange 42. The other ends of rods 43 engage with section member 58 which supports the linings 34. At the same time, the linings 34' are secured in a supporting member 59 which is engaged by plate 40.

Two studs 53 disposed in a plane at right angles to the plane containing the rods 43 extend through the cylinder 37 but are slidably mounted in the orifices in which they are fitted; these studs also extend through the flange 42 and plate 40. Their purpose is to properly position the flange 42 relative to the cylinder. Return springs 54 are disposed externally of the cylinder 37 and their ends are anchored on the heads of studs 53, and on the plates 40 of linings $34^1$. These return springs 54 are adapted to return the linings 34, $34^1$ to their inoperative positions, that is, in proper spaced relationship to the disc, when the brake control is released.

If desired and for additional safety, the two studs 53 may be interconnected by a yoke disposed externally of the flange 42, to avoid any accident in case of failure of one spring 54.

Figure 7:
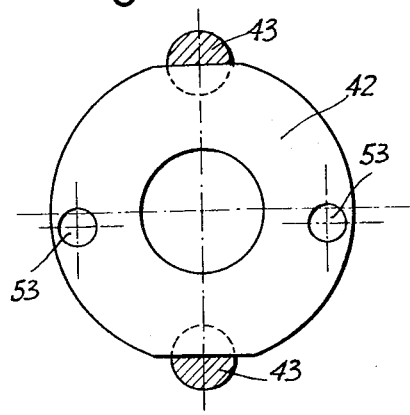
FIGURES 7 and 8 are sections taken upon the line 7—7 of FIG. 5 to show two different forms of clamping flange associated with the brake.
Figure 8:
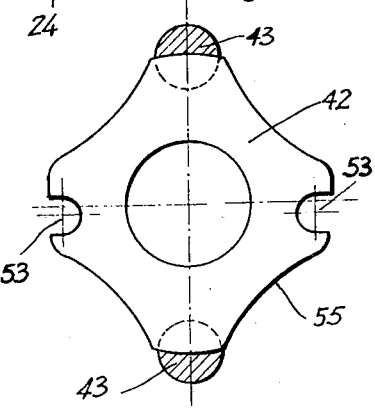

FIGURES 7 and 8 illustrate two modified forms of embodiment of the flange 42.

The linings are replaced as follows in this case:

Firstly, the return springs 54 are removed by unhooking them from the studs 53 and plate 40. Then the flange 42 may be removed either by causing it to slide laterally if it has the shape shown in FIG. 7, or by rotating it about the cylinder axis in the case of FIG. 8, as the recesses 55 of this flange place themselves under the rods 43, or by acting upon any other adequate type of flange-locking means.

Then, the rods 43 may slide freely in the cylinder 37 to permit the removal of linings 34, $34^1$ and their substitution by new ones.

Of course, any play take-up device may be provided whereby the control pistons may be moved toward each other before fitting new linings. A typical example of a device of this character is described and illustrated in U.S. patent application Ser. No. 588,641, filed on June 1, 1956, now Patent No. 2,946,408.

I claim:

1. In a disc brake for a vehicle wheel, an annular flat disc, support means for said disc connected to said wheel and formed with radial arms having their free ends engaged in said disc, said arms being bent substantially at a right angle whereby their ends extend substantially to the radial center of said disc, a first pair of linings on the side of said disc registering with said support means, one of said linings being disposed on the outer periphery of said disc and the other of said linings being disposed on the inner periphery of said disc, a second pair of linings associated with each other on the other side of said disc, means for holding said first pair of linings, and said second pair of linings being free for movement toward and away from said disc but being held against movement circumferentially with respect to said disc, a pair of pistons actuated by hydraulic pressure and disposed on the side of said disc opposite said support means, said pistons being contained in a cylinder rigidly connected with a fixed part of the vehicle, means actuated by one of said pistons for transmitting movement toward and away from said disc to said first pair of linings and means for transmitting movement actuated by the other of said pistons toward and away from said disc to said second pair of linings.

2. Disc brake according to claim 1, wherein said means for transmitting the movement of said pistons to said linings comprises bearing members acting upon the respective linings and wherein each lining is embedded in a section member having welded on its back side a plate formed with a notch for guiding the bearing member actuated by the corresponding piston of the cylinder, the thickness of said plate being smaller than the maximum wear contemplated for the lining.

3. Disc brake according to claim 1, wherein said cylinder includes a chamber adapted to receive liquid for adjusting the relative spacing of the pistons and said chamber is provided with drain means.

4. Disc brake according to claim 1, wherein the pistons act in opposite directions and said means for transmitting the movement of said pistons to said linings comprise intermediate members between which return springs are disposed.

5. Disc brake according to claim 1, wherein the linings disposed on the side opposite to the cylinder receive the braking pressure through the medium of rods carrying at their ends lugs engaging said linings on a bearing surface extending at right angles to the disc radius passing through the middle of the lining concerned.

6. In a disc brake for a vehicle wheel, an annular disc, support means for said disc on one side of said disc connected to said wheel and formed with radial arms having their free ends engaged in said disc, each of said arms being bent substantially at a right angle, a first pair of linings on the side of said disc registering with said support means, one of said linings being disposed on the outer periphery and the other on the inner periphery of the disc, and a second pair of linings carried by bearing plates and being associated with each other on the other side of the disc, a pair of pistons actuated by hydraulic pressure and disposed on the side of said disc opposite said support means, said pistons being contained in a cylinder rigidly connected with a fixed part of the vehicle, a bearing plate engaging the second pair of linings, a flange, rods with lugs connecting said flange to said first pair of linings, one of said pistons being in engagement with said bearing plate and the other of said pistons being in engagement with said flange, whereby said rods hold said linings against excess outward movement away from said disc, said flange extending transversely across said cylinder, said rods extending axially through said cylinder and being formed with notches positioned to engage the edge of said flange whereby movements of said flange are transmitted through said rods to the outer linings of the disc, said flange being held in position by easily detachable studs extending through the cylinder, said studs anchoring said bearing plate against circumferential motion, spring means for urging the linings to their released positions interposed between the heads of said studs and the bearing plates of said inner linings, whereby the linings may be released by removing the return springs, releasing the holding studs, and causing the rods to slide out, whereby the flange may be removed.

References Cited in the file of this patent

UNITED STATES PATENTS 1,953,575    Von Oberstadt    Apr. 3, 1934

FOREIGN PATENTS 718,108    Germany    Feb. 9, 1943
714,962    Great Britain    Sept. 8, 1954